Figure 1:
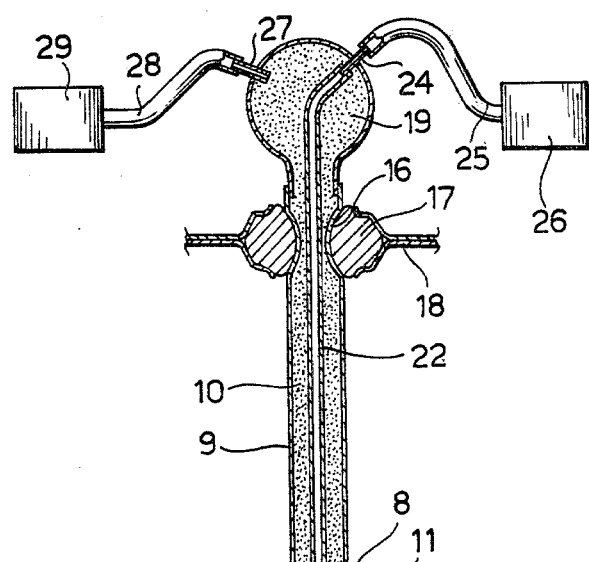

United States Patent [19]

Palitto

[11] 4,334,600
[45] Jun. 15, 1982

[54] OLEO-PNEUMATIC SHOCK ABSORBER

[75] Inventor: Mauro Palitto, Collegno, Italy

[73] Assignee: Fiat Auto S.p.A., Turin, Italy

[21] Appl. No.: 163,140

[22] Filed: Jun. 26, 1980

[30] Foreign Application Priority Data

Jul. 26, 1979 [IT] Italy .................................. 68555 A/79

[51] Int. Cl.³ .............................................. F16F 9/06
[52] U.S. Cl. ..................................... 188/314; 188/269
[58] Field of Search ............... 188/269, 282, 314, 317; 267/64.15, DIG. 1

[56] References Cited

U.S. PATENT DOCUMENTS 2,225,986  12/1940  Glezen .................................. 188/314

Primary Examiner—Duane A. Reger
Attorney, Agent, or Firm—Sughrue, Mion, Zinn, Macpeak and Seas

[57] ABSTRACT

An oleo-pneumatic shock absorber for use as a load-bearing element in a vehicle wheel-suspension arrangement. The shock absorber comprises a cylinder attachable at its lower end to the wheel hub, a drowned piston housed in the cylinder and connected by a piston rod to the vehicle body, and flow-determining means determining fluid flow past the piston during operation of the shock absorber. The drowned piston and piston rod are jointly constituted by a hollow rod closed at its end projecting from the cylinder. This hollow rod contains oil and gas. Means can be provided to adjust the quantity of gas and oil in the shock absorber.

2 Claims, 2 Drawing Figures

U.S. Patent

Jun. 15, 1982

4,334,600

OLEO-PNEUMATIC SHOCK ABSORBER

The present invention relates to oleo-pneumatic shock absorbers for use as load-bearing elements in vehicle wheel-suspension arrangements. In particular, the invention is concerned with oleo-pneumatic shock absorbers of the type comprising an oil-containing cylinder arranged for connection to the hub of a wheel, a drained piston located in said cylinder and provided with flow-determining means for determining fluid flow past the piston during operation of the shock absorber, and a piston rod extending from the piston out of the cylinder for connection at its external end to the body of a vehicle.

In the development of the most recent oleo-pneumatic shock absorbers considerable effort has been expended in trying to reduce the overall weight and volume of the shock absorber without compromising its elasticity and extent of travel.

A shock absorber of the above-mentioned type is described in German patent No. 2116913 of Fichtel and Sachs and comprises a hollow external cylinder containing gas and oil which are separated by a bored screen serving a damping function, and by a solid drowned piston provided with flow-determining means in the form of valves. Such a shock absorber, even though possessing only a few components, is nevertheless of considerable weight due to the fact that the cylinder must have appreciable dimensions in order to contain sufficient gas to ensure the elasticity and travel necessary for proper functioning. Of course, the weight of the shock absorber increases rapidly with increasing cylinder size due to the presence of the said piston.

The object of the present invention is therefore to provide an oleo-pneumatic shock absorber of the above-mentioned type which, while possessing good elasticity and a large travel, is of reduced volume and weight.

This object is achieved in accordance with the invention by the provision of an oleo-pneumatic shock absorber of the aforesaid type wherein the piston and piston rod are jointly constituted by a hollow rod which is closed at its external end and contains gas and oil.

Figure 2:
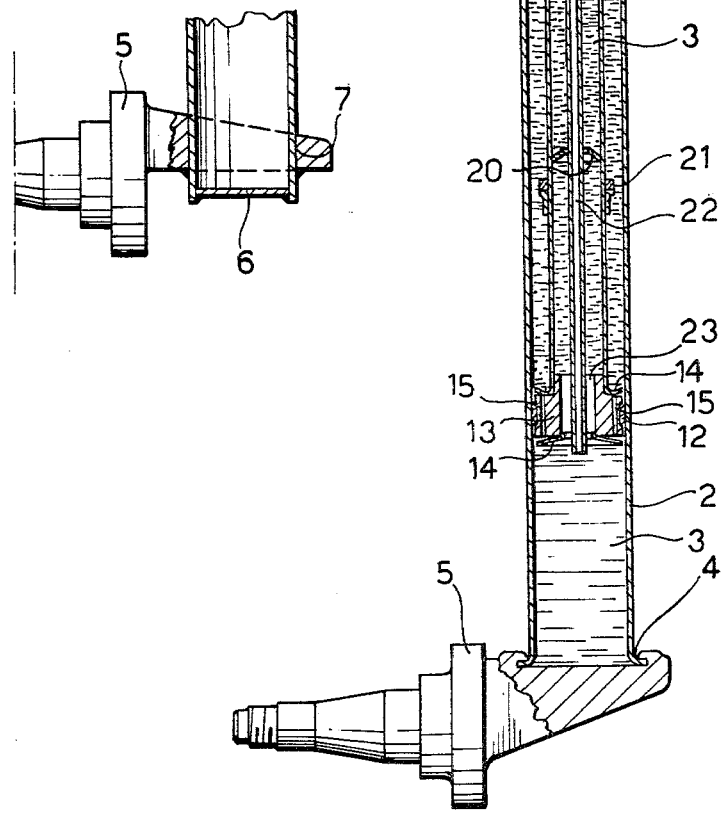

An oleo-pneumatic shock absorber embodying the invention will now be particularly described, by way of example, with reference to the accompanying diagrammatic drawing, in which:

FIG. 1 is a sectional view of the shock absorber showing its attachment to the body of a vehicle and to the hub of a wheel; and FIG. 2 is a sectional view showing a modified form of attachment of the shock absorber to the hub of the wheel.

The oleo-pneumatic shock absorber 1 shown in the drawings is interposed between the body 18 of a vehicle and a wheel hub 5 and forms part of the wheel suspension. The shock absorber 1 comprises an outer hollow metal cylinder 2 which is closed at its lower end and serves the dual function of acting as a load bearing structure and of containing oil 3.

The lower end of the cylinder 2 has an external flange 4 which is connected to the wheel hub 5 (and thereby to other parts of the wheel suspension) by means of a rolled joint.

The manner of connection of the cylinder 2 and wheel hub 5 can of course be varied according to the requirements of construction and to the type of use envisaged. Thus, for example, the cylinder 2 could be closed at its lower end by a wall 6 (see FIG. 2), and the cylinder 2 joined to the hub 5 by being force fitted into a hole 7 bored in the hub 5 and then secured in position by welding.

In the case of suspensions in which the shock absorber does not perform a link function, the connection of the shock absorber to the remainder of the suspension could be effected by the use of pivoted ferrules in accordance with known practice.

A hollow rod 9 extends into the cylinder 2 through the upper end thereof, the passage of the rod 9 into the cylinder being sealed by means of a gasket 8 of known type expressly designed for oleo-pneumatic shock absorbers. The hollow rod 9 contains both oil 3 and gas (usually nitrogen) 10.

The rod 9 is free to slide inside the cylinder 2, along its longitudinal axis and is guided in this movement by two guide bushes 11 and 12, one of which is screwed into the upper end of the cylinder 12 and the other being secured around a valve unit 13 positioned adjacent the end of the rod 9 which is situated inside the cylinder 2. The valve unit 13 with the guide bush 12 constitute a drowned piston and the rod 9 constitutes a piston rod.

The internal surface of the cylinder 2 and the external surface of the rod 9, both have a perfectly regular and smooth finish in order to facilitate the relative sliding of the rod and cylinder and to avoid wear on the guide bushes 11 and 12.

The valve unit 13 comprises two or more flap valves 14 controlling the flow of fluid through bypass passages 15 arranged to conduct fluid past the lower end of the rod 9. The arrangement of the valves 14 and passages 15 and the dimensions of the latter are selected in accordance with the desired operational stiffness of the shock absorber.

Adjacent its upper end the external portion of the hollow rod 9 is formed with a neck 16 serving to locate and retain a block of elastomer material 17. This block 17 connects the shock absorber 1 to the body 18. It will be appreciated that various other means (including conventional pivoted ferrules) can be used to connect the rod 9 to the vehicle body 18, the particular means used being dependent on the constructional and operational requirements placed upon the shock absorber 1.

A tank 19 in the form of a spherical bowl is secured directly onto the external end of the rod and serves to increase the gas capacity of the rod 9.

An annular baffle 20 is located inside the rod 9 for the purpose of preventing emulsification of the gas and oil. The position of the baffle 20 axially of the rod 9 depends on the operational requirements of the shock absorber.

A metal ring 21 is secured to the external surface of the portion of the hollow rod 9 located inside the cylinder 2. This ring 21 serves as an end stop for limiting the relative movement of the rod 9 and cylinder 2.

A small bore tube 22 of metal or elastomer material extends through the interior of the hollow rod 9 and an axial hole 23 provided in the valve unit 23 to protrude from the latter by a small amount. The end of the tube 22 remote from the valve unit 13 is connected to a tube connector 24 arranged in the upper portion of the wall of the tank 19. The connector 24 serves to join the tube 22 to a flexible tube 25 which is connected to a unit 26 of known type arranged to supply or receive oil to and from the shock absorber 1. By means of this arrangement the oil in the shock absorber 1 can be replaced and it becomes possible to reduce or increase the oil level in dependence on the usage of the vehicle (including the type of ground over which the vehicle is to be used).

A second tube connector 27 is also arranged in the upper portion of the tank wall. This connector 27 serves to communicate the interior of the tank 19 with a flexible tube 28 connected to a unit 29 for the supply or collection of gas to or from the shock absorber 1. The provision of the unit 29 enables the quantity of gas present in the hollow rod to be increased or reduced as required.

In certain circumstances it may prove impractical to provide the tank 19 at the upper end of the rod 9 and in this case the upper end of the rod is closed by a plug which is secured in position by screwing, welding or in some other way; the tube connectors 24 and 27 will be located in the plug.

It is also possible to construct the shock absorber without one or both of the units 26 and 29 for the supply and collection of the oil and gas. In this case the tube connectors 24 and 27 would be formed as valves manually operable to permit the levels of oil and gas inside the shock absorber to be varied.

I claim:

1. An oleo-pneumatic shock absorber for use as a load-bearing element in a vehicle wheel-suspension arrangement comprising an oil-containing cylinder arranged for connection to the hub of a wheel, a drowned piston located in said cylinder and provided with flow determining means for determining fluid flow past the piston during operation of the shock absorber, a piston rod extending from said piston out of said cylinder for connection at the external end thereof to the body of a vehicle, said piston and piston rod being hollow in construction and having closure means at the external end thereof and a supply of gas and oil therein, and a tube extending through the interior of said hollow rod which projects from the end thereof located inside said cylinder and means providing access to said tube externally of said rod adjacent the external end of said rod and connected to a unit for the selective supply and removal of oil to said cylinder.

2. An oleo-pneumatic shock absorber as set forth in claim 1, further comprising an additional unit having means for selectively supplying and removing gas from the interior of said rod.

* * * * *